July 16, 1957 F. H. RAYMOND 2,799,746
ELECTROMAGNETIC RELAYS
Filed June 6, 1956 2 Sheets-Sheet 1
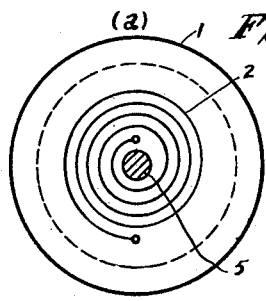
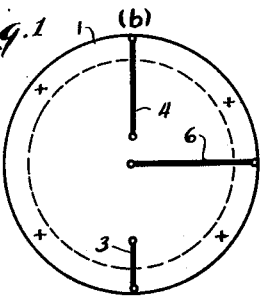
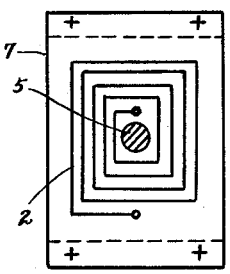
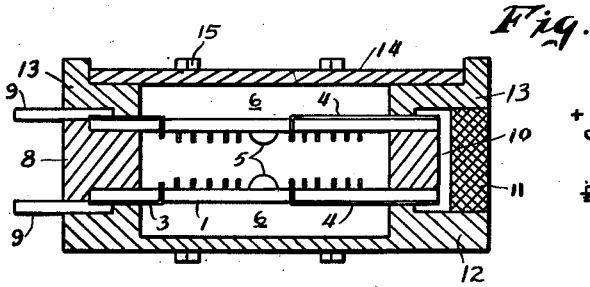
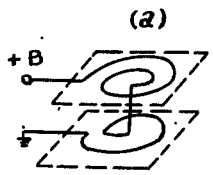
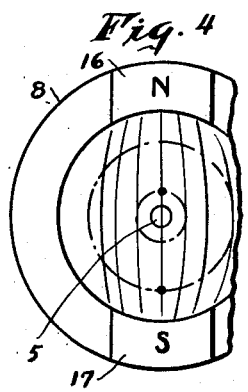
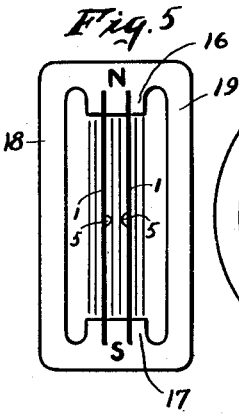
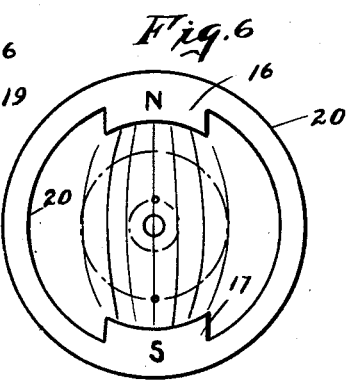
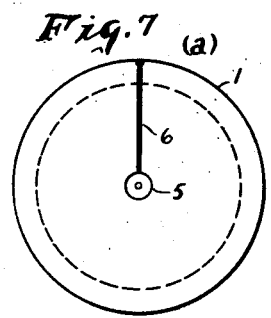
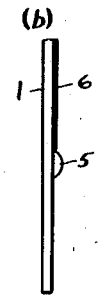
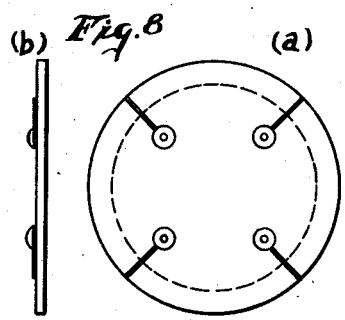
INVENTOR.
FRANÇOIS HENRI RAYMOND
BY Theodore Hafner
ATTORNEY July 16, 1957  F. H. RAYMOND  2,799,746
ELECTROMAGNETIC RELAYS
Filed June 6, 1956  2 Sheets-Sheet 2
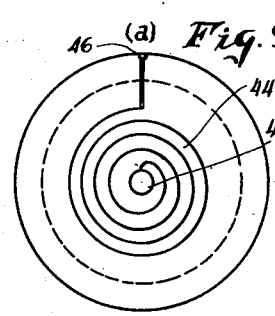
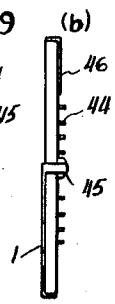
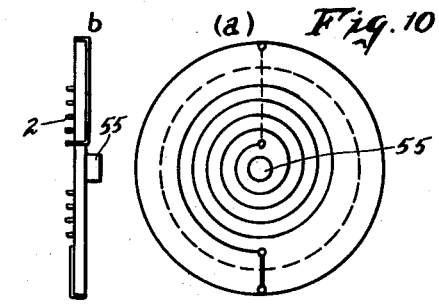
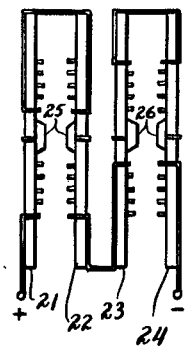
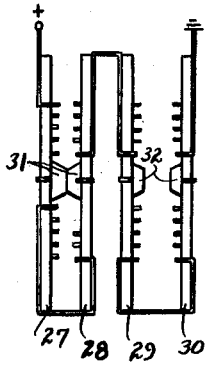
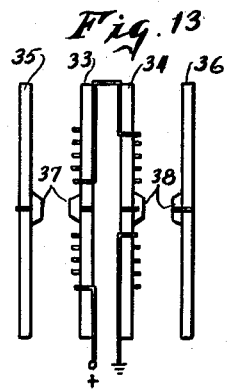
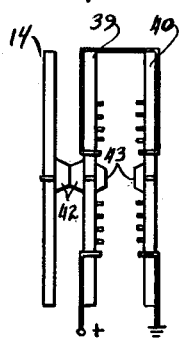
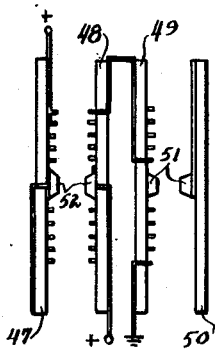
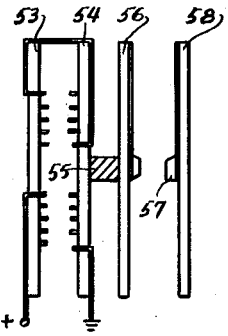
INVENTOR.
FRANÇOIS HENRI RAYMOND
BY *Theodore Hafner*
ATTORNEY

United States Patent Office 2,799,746
Patented July 16, 1957

2,799,746

ELECTROMAGNETIC RELAYS

François Henri Raymond, Saint-Germain-en-Laye, France, assignor to Societe d'Electronique et d'Automatisme, Courbevoie, France Application June 6, 1956, Serial No. 589,815

Claims priority, application France June 15, 1955

15 Claims. (Cl. 200—87)

The present invention relates to improved electromagnetic relays wherefor the make and/or break contact pressures are as low as, for instance, a few decigrams per square millimetre of cross-section of each contact thereof.

One object of the invention is to provide an electromagnetic relay of such a kind which presents a very high speed of operation of the contacts included therein in response to the closings and openings of the energization circuit thereof.

Further objects of the invention will be apparent from the following disclosure.

It is well known that the conductors of a parallel pair, when energized, attract or repulse one another according to the direction of flow of the currents therethrough and, in any case where they are free, these conductors suddenly depart from their relative positions when these currents are applied thereto or suppressed therefrom.

According to one feature of the invention, an electromagnetic relay includes at least a pair of serially connected spiral coils which are supported in closely set parallel planes by means of supporting members one of which at least is resilient in the direction transverse to these planes, and at least a pair of electrical contacts the relative motion of which is controlled from the relative motion of these coils.

So-called "printed" circuits are also well known and, for instance, spiral coils and electrical connections therefor may be obtained as well upon mechanically resistant as upon flexible supporting members from the so-called photo-etched process, viz. a dielectric sheet may be coated with a metallic film, this film coated with a photo-sensitive film resist, the picture of the coil photographed thereon, developed and fixed, and the thus formed product submitted to an etching fluid until all the superfluous metal is removed. Use may be made for the supporting member of a sheet of a high temperature resisting plastic such as is the plastic known under the commercial name of "Mylar" for instance.

It is submitted that a printed conductor is specially known to have the property of carrying electric currents of much higher a value than those carried by an ordinary insulated wire; for instance, a printed copper conductor having a thickness equal to .1 millimetre and a width equal to .2 millimetre can, without any injury thereto, carry a D. C. current as high as 1 ampere.

According to another feature of the invention, any spiral coil in the above-defined relay structure which is supported by a resilient or flexible member is made in accordance to the said "printed conductor" technique.

These and other features of the invention will be apparent from the following description of the accompanying drawings, wherein:

Fig. 1 illustratively shows an example of embodiment of a printed coil for use in the structure of an electromagnetic relay, Fig. 2 shows an alternative shape for this coil, Fig. 3 shows a cross-section view of an electromagnetic relay including a pair of printed coils according to the design of Fig. 1, Figs. 4, 5 and 6 respectively show alternative designs of an electromagnetic relay including such coil elements, Figs. 7 to 10, inclusively, respectively show certain modified and auxiliary printed components for electromagnetic relays according to the invention, and Figs. 11 to 16 respectively show some of the relay assemblies which may be obtained from the basic coil elements and the auxiliary elements as disclosed in Figs. 1 and 7 to 10.

Referring to Fig. 1, the two opposite faces of a printed element for an electromagnetic relay are respectively shown at (a) and (b). This element comprises a sheet 1 of a flexible dielectric material such as hereinabove defined and on one face thereof is "printed" a spiral coil 2 and also, separately from this conducting coil and at the center thereof, a metallized area is preserved for the soldering thereto of an electrical contact 5. Suitable bores have been provided in this sheet 1 and duly metallized so that the electrical connections for this coil and this contact may have been formed on the other face of the sheet as shown. Connecting conductors 3 and 4 relate to the coil, connecting conductor 6 to the contact. The shape of the spiral coil is not imperatively given and, for instance, this coil may have rectangular turns, see for instance Fig. 2. The shape of the sheet is related to the assembling supports.

Two such elements as shown in Fig. 1 may be serially connected as indicated at (a) in Fig. 3, through the interconnection of their center points. If then one end of the composite winding thus obtained is connected to the ground and the other end receives a positive battery voltage, +B, the two coils will attract one another and the contacts 5 will make a contact therebetween. When the battery voltage is suppressed, these contacts will break since the coils will be spaced apart from the resiliency of their supporting sheets.

The cross-section of Fig. 3 shows the mechanical assembly of such a simple relay. A ring spacer 8 is inserted between the edges of the two sheets so that, in the rest condition of the relay, when no coil is energized, the contacts 5 are spaced apart. Terminals such as 9 have been soldered to the respective ends of the conductors 3 and these terminals pass through holes provided in the respective dielectric members 12 and 13 constituting the housing of the relay. A connecting strap 4 has been inserted for serially connecting the conductors 4 of the two coil elements. A stop 11 is then placed in the hole provided for putting this strap in its own place. Of course, separate terminals may have been provided for the conductors 4 and the strapping made between these terminals outside the casing. Other terminals are soldered to the ends of the conductors 6 but are not shown in Fig. 3 as being outside the plane of the cross-section of the relay assembly.

The member 12 of the casing, for instance, receives all the component parts and then the member 13 is set and affixed through a cover 14 by means for instance of screws as shown at 15. In such an assembly, the sheets 3 are hardly pinched by their respective rims, as indicated in Fig. 1 by the dot line which shows the limit of this annular rim. They are stretched but their proper resiliency and flexibility enable them to be distorted each time a current passes through the series coils under the attractive force developed therefrom between these coils. Such a distorting action will be very fast since each element possesses a very small inertia and this force is of a quite sudden growth resulting from the overshoot of the intensity of the current when the circuit thereof is closed.

The value of this attraction force may be deduced from the following relation:

(i) $$F = \tfrac{1}{2} I^2 \cdot (dL/de)$$

wherein:

$F$ = attractive force
$I$ = current value
$dL$ = variation of the self-inductance L of the system when the distance $e$ between the coils is varied,
$de$ = variation of distance between the coils.

Illustratively, an electromagnetic relay according to Figs. 1 and 3 was made with the coils each having thirty turns of a printed conductor of .1 mm. of thickness and .2 mm. of width, and each coil was included within a ring having a width equal to 1 centimetre and an average diameter also equal to 1 cm. The attraction force in this relay was of the order of 360 dynes when the contacts closed, for a current density of 1 ampere in the coils. The speed of response of the relay to the application of the current was of the order of 30 microseconds. It must be noted that for a copper coiled conductor of the above said size, printed upon a "mylar" sheet, the destructive current value neighbours 50 amperes.

A reversal of the relative connection between the two coils changes the attraction force to a repulsive one. If then the contacts are closed in the rest condition of the relay, they will break their circuit when the coils are energized.

The value of the attractive or repulsive force between the coils may be substantially increased, if needed, by the provision of a permanent magnetic field of a suitable direction in the relay structure. This field will not have any action with respect to the speed of response of the relay.

For instance, the pair of coils and their supporting sheets may, as shown in Fig. 4, be placed between two pole-pieces 16 and 17, of opposite polarities N and S, which are inserted in the annular portion 8 of the casing. Several pole-pieces of identical polarity may, if required, be thus inserted along the periphery of this ring, a corresponding plurality of pole-pieces of opposite polarity being provided on the other side of this periphery.

Such pole-pieces may be provided as independent magnets or may be cut from a magnetic circuit of a magnet or even of an electro-magnet. In Fig. 5, for instance, such a magnetic circuit is shown and closed through magnetic legs 18 and 19 on either sides of the relay coil unit and the sheets 1 are pinched between these legs and the pole-pieces 16 and 17. According to Fig. 6, an alternative arrangement may comprise a toroidal piece 20 constituting the body of the magnetic circuit and surrounding the coil arrangement of the relay.

The physical effect of such an additional magnetic field is quite plain. The traction T, transverse to the direction of movement of the coils, and applied to these coils by the said additional magnetic field is given by the relation:

(ii) $$T = \frac{(\phi + \varphi)^2}{8\pi}$$

wherein:

$\phi$ = magnetic flux from this magnetic circuit,
$\varphi$ = magnetic flux from the coils,
$\pi$ = the conventional constant.

Multiple contact relays may be made solely from the component shown in Fig. 1. For instance, Fig. 11 shows such a relay which includes a pair of make contacts and Fig. 12 shows such a relay which includes inverter contacts.

In Fig. 11, use is made of four components such as shown in Fig. 1. The two components 21 and 22 are so interconnected that they attract one another when energized, and the two components 23 and 24 are similarly connected. But the coils of the components 22 and 23 are so interconnected that they repel one another when energized. All the coils are serially mounted and consequently when a control current flows therethrough, the contacts 25 on one side, and the contacts 26 on the other side, will be closed.

In Fig. 12, the four component parts 27, 28, 29 and 30 are so interconnected that, when a current flows through their coils, the components 27 and 28 repel one another whereas the components 29 and 30 attract one another. In the rest condition of the relay, the contacts 31 are closed and the contacts 32 are open. In the work condition, the positions of the contacts are reversed. When the contacts of the components 28 and 29 are not interconnected, the relay will have a rest contact and a work contact. When these are connected, the relay will include an inverter contact.

The assemblies of multiple contact relays can however be simplified when, according to an auxiliary feature of the invention, use is made of certain simplified component parts. In Fig. 7, for instance, a component of this kind is shown which only comprises a contact and the connection therefor printed upon a flexible dielectric sheet. Several contacts can also be printed upon a single supporting sheet as, for instances shown in Fig. 8. However, if such contact components as the one shown in Fig. 8 were used, special coil-bearing components ought to be also provided, with corresponding contacts, which may be considered as a drawback since this scheme involves the printing of the coils.

Figs. 13 and 14 clearly show the simplification resulting from the use of components such as shown in Fig. 7 when these components are used for the purposes of the relay arrangements previously disclosed in relation to Figs. 11 and 12. The relay of Fig. 13 includes a pair of work contacts and is constituted by two coil-bearing components 33 and 34, each upon a flexible sheet, and so interconnected as to repel one another when the current flows therethrough. Their contacts 37 and 38 then close upon the fixed contacts of components 35 and 36 which may be printed upon non-flexible sheets.

In the relay of Fig. 14, a pair of coil-bearing components 39 and 40 are provided and so interconnected as to attract one another when the current flows therethrough. The component 39 bears ont contact on each side thereof. One of these contacts makes part of a rest contact 42, the other one of this pair being fixed and, for instance being printed upon a non-flexible base. The other one of the contacts borne upon 39 makes part of the work contact of the relay. It is apparent that this arrangement actually constituted an inverter contact relay.

The above arrangements are only indicative of the various possibilities ensured by the invention for the design of electromagnetic relays. If it is estimated useful, in a contact and coil assembly according to the invention, end contacts of a pile may be made in a conventional fashion and not in the printed way, and supported by end plates of the casing.

In order to obtain self-maintaining relays with an easy mounting, a further component may be provided such as is shown in Fig. 9. This component bears a printed coil terminating at its center end by an electrical contact 45 and, at its outer end by a connection 46. Such an element is for instance introduced at 47 in the relay arrangement shown in Fig. 15. In this example the battery voltage is applied to the said component 47. The relay also comprises a pair of coil-bearing components 48 and 49 so interconnected as to repel one another when the current flows therethrough, each one of these components being provided with a separate contact, and a further component 50 which is of the kind shown in Fig. 7. The work contact pair of this relay is constituted by this latter contact and the one attached to the component 49. When the energizing current flows first through the coils of the components 48 and 49, these elements repel one another and the maintenance contact 52 is closed. When the energizing current is suppressed, a current from the battery passes through the coil of the component 47 and the contact 52, and consequently through the coil of the components 48 and 49. The coils of the components 47 and 48 are of such respective directions that these elements attract one another and consequently the relay is maintained in its work condition until the battery is suppressed upon 47. The maintaining current will also maintain the repulsive effect between the components 48 and 49 and consequently the work contact 51 will remain in its operative condition as long as the coil 47 is energized.

Finally, it may be of advantage, in certain assemblies at least, to separate the coils and the contacts. In such a case, use is made of components bearing a conductor coil and an insulating tab at the center thereof. In Fig. 16 for instance, two components 53 and 54 are shown with their respective coils so interconnected that these elements will repel when a current will pass therethrough. The element 54 is provided with an insulating tab only, as shown in Fig. 10, see the tab 55 therein. In the rest condition of the relay, this tab 55 bears against the rear face of a component 56 which bears an electrical contact for cooperation with a further contact borne by a further component 58. When the relay is energized, element 54 is repelled and pushes element 56 for making the work contact 57. If the component 58 was provided with a tab on its other face, the effect could be extended at will to further work contacts.

Having thus described and ascertained my invention, I claim:

1. An electromagnetic relay comprising at least one pair of serially connected spiral coils which are supported in closely set parallel planes by means of supporting members one of which at least is resilient in a direction transverse to that of these planes, and at least one pair of electrical contacts the relative motion of which is controlled from the relative motion of these coils.

2. An electromagnetic relay according to claim 1, wherein part at least of these coils are obtained upon their own supporting members by the so-called "printing" process for electrical circuitry.

3. An electromagnetic relay according to claim 1, wherein the said supporting members are spaced apart by means of dielectric frames and mechanically maintained therein from at least a partial pinching of their edges between said frames.

4. An electromagnetic relay according to claim 1, wherein the said contacts are, partly at least, borne at the center place of the said coils upon the supporting members of these coils.

5. An electromagnetic relay according to claim 1, wherein part at least of the said contacts are borne by separate supporting members.

6. An electromagnetic relay according to claim 5, wherein part at least of the coil supporting members are provided with insulating tags at their middle places for cooperating with electrical contacts supported by members distinct from those supporting the said coils.

7. An electromagnetic relay according to claim 2, wherein the coil connections are further printed upon the same supporting members as are the coils.

8. An electromagnetic relay according to claim 7, wherein these connections are, partly at least, printed on the face of the supporting members opposite to those which bear the said coils, through-connections being provided in these members for uniting the said coils and the said connections.

9. An electromagnetic relay according to claim 4, wherein the contact connection is also printed on the said supporting member and on the face of this member opposite to the one which bears the said coil.

10. An electromagnetic relay according to claim 5, wherein the contact connection is printed upon the said supporting member and the contact soldered thereupon on one side at least of the said member.

11. An electromagnetic relay according to claim 5, wherein part of these members which support separate contacts also bear a coil terminating through an electrical connection to the said contact.

12. An electromagnetic relay according to claim 4, wherein several contacts are distributed around the coil upon part at least of these coil-bearing members.

13. An electromagnetic relay according to claim 5, wherein several contacts are distributed according to a predetermined pattern on one side at least of the said supporting members.

14. An electromagnetic relay according to claim 6, wherein insulating tags are provided on part at least of those supporting members which bear solely electrical contacts thereon together with the electrical connections for the said contacts.

15. An electromagnetic relay according to claim 1, wherein a magnet arrangement cooperates with the coil arrangement in order to apply a permanent magnetic field to part at least of the intervals between the coils, the said field having its lines of flux parallel to the said parallel planes of the coils.

References Cited in the file of this patent

UNITED STATES PATENTS

| | | |
|---|---|---|
| 1,754,349 | Bruhlman | Apr. 15, 1930 |
| 1,783,495 | Burkas | Dec. 2, 1930 |
| 2,695,350 | Shultz | Nov. 23, 1954 |